R. R. REDMAN.
CLUTCH.
APPLICATION FILED SEPT. 30, 1912.
1,096,752. Patented May 12, 1914.
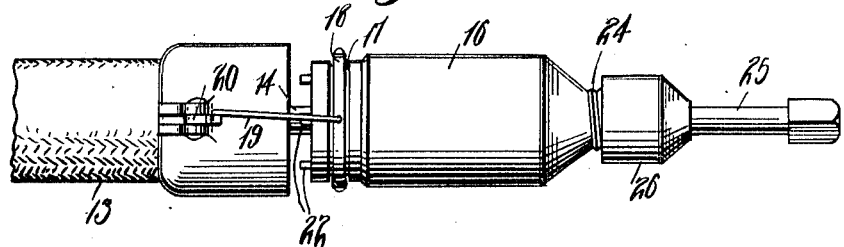
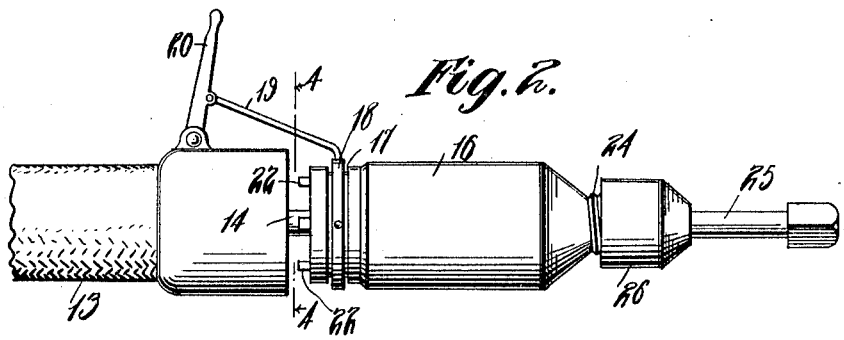
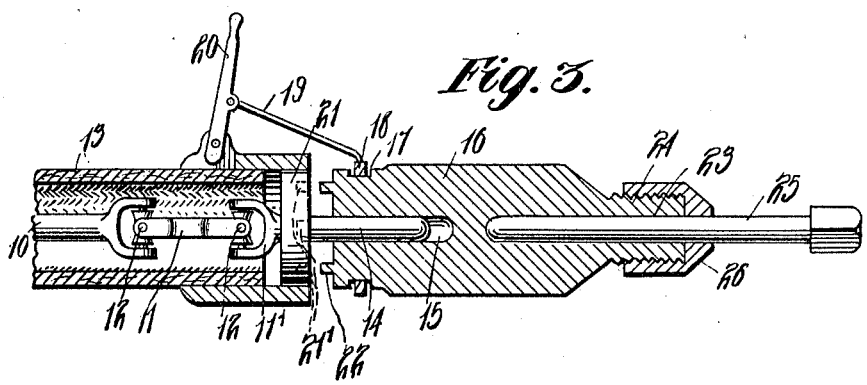
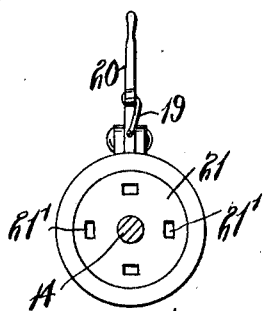
Witnesses
W. C. Fielding
Harry M. Test
Inventor
R. R. Redman,
By Chandler & Chandler
Attorneys

UNITED STATES PATENT OFFICE.

RICHARD R. REDMAN, OF MILBANK, SOUTH DAKOTA.

CLUTCH.

1,096,752. Specification of Letters Patent. Patented May 12, 1914.

Application filed September 30, 1912. Serial No. 723,189.

*To all whom it may concern:*

Be it known that I, RICHARD R. REDMAN, a citizen of the United States, residing at Milbank, in the county of Grant, State of South Dakota, have invented certain new and useful Improvements in Clutches; and I do hereby declare the following to be a full, clear, and exact description of the invention, such as will enable others skilled in the art to which it appertains to make and use the same.

This invention relates to improvements in clutches.

The principal object of the invention is to provide a clutch by means of which rotary tools or the like may be quickly thrown into or out of operation, and the speed of the same increased or diminished to suit the operator.

Other objects and advantages will be apparent from the following description and with particular reference to the accompanying drawings.

In the drawings: Figure 1 is a plan view of my device, Fig. 2 is an enlarged elevation of the tool holder, illustrating the clutch, Fig. 3 is a vertical longitudinal sectional view therethrough, and Fig. 4 is a transverse section on the line 4—4 of Fig. 2.

Referring particularly to the accompanying drawing, 10 represents a flexible shaft which is composed of a series of links 11, universally joined through adjacent links as at 12, so that the tube 13 covering the shaft may be bent in any direction, and the shaft be permitted to rotate therein. The terminal link 11' of the flexible shaft is provided with an extension 14, which is received in the bore 15 of a block 16, the rear portion of said block being formed with a groove 17 to receive the forked end 18 of a link 19 pivotally connected to a lever 20, which is pivotally mounted on the end of the tube 13 whereby the block 16 may be shifted toward and away from the tube. Also carried by the link 11' is a disk member 21 provided with sockets 21' in its outer face adapted to be engaged by the projections 22 carried by the end of the block 16. On the outer end of the block 16 is a socket 23, having the threaded extension 24 into which are adapted to be passed suitable tools 25 as desired, a clamping nut 26 being engaged on the threaded extension for clamping the tool in the block.

My invention includes a tool holder which can be used in any position, and by means of the lever 20 the tool may be stopped and started as desired, without the necessity of changing the speed and stopping the motor.

In operating the device the shaft is driven at the proper speed desired, and the tool then taken to the place where it is to be used. The control of the tool is then had by shifting the lever 20, which engages or disengages the projections with respect to the recesses of the disk 22.

What is claimed is:—

A motor driven tool device including a shaft, a disk on one end of the shaft provided with recesses, a bearing supporting the disk, a central projection on the disk, a tool holder having a longitudinal bore receiving the said projection slidably therein, a series of teeth on the holder for engagement with the said recesses, and a pivoted lever carried by the said bearing and connected to the holder for moving the holder toward and away from the disk.

In testimony whereof, I affix my signature, in presence of two witnesses.

RICHARD R. REDMAN.

Witnesses:
 GEO. S. RIX,
 JOSEPHINE HILLESTAD.

---

Copies of this patent may be obtained for five cents each, by addressing the "Commissioner of Patents, Washington, D. C."